US008787703B2

(12) United States Patent
Kandal et al.

(10) Patent No.: US 8,787,703 B2
(45) Date of Patent: Jul. 22, 2014

(54) METHOD FOR SIMPLIFIED STORAGE OF DATA REPRESENTING FORMS

(75) Inventors: Philipp Kandal, Tettnang (DE); Stefan Karschti, Cluj (RO)

(73) Assignee: skobbler GmbH, Berlin (DE)

( * ) Notice: Subject to any disclaimer, the term of this patent is extended or adjusted under 35 U.S.C. 154(b) by 128 days.

(21) Appl. No.: 13/412,215

(22) Filed: Mar. 5, 2012

(65) Prior Publication Data
US 2013/0142453 A1    Jun. 6, 2013

(30) Foreign Application Priority Data

Dec. 6, 2011  (EP) .................................... 11192147

(51) Int. Cl.
*G06K 9/32*    (2006.01)
*G08G 1/123*    (2006.01)
(52) U.S. Cl.
USPC .......................................... 382/300; 701/532
(58) Field of Classification Search
CPC ............................ G01C 21/32; G01C 21/3667
USPC .......... 382/104, 300, 305; 701/400, 409, 532;
340/995.1
See application file for complete search history.

(56) References Cited

U.S. PATENT DOCUMENTS

| 5,546,515 | A  | * | 8/1996  | Mochizuki ..................... 345/606 |
| 5,583,494 | A  | * | 12/1996 | Mizutani et al. ......... 340/995.14 |
| 6,931,322 | B2 | * | 8/2005  | Jung et al. ..................... 701/446 |
| 7,072,765 | B2 | * | 7/2006  | Schmidt et al. ............... 701/431 |
| 7,920,872 | B2 | * | 4/2011  | Hessling et al. ........... 455/456.1 |
| 8,086,401 | B2 | * | 12/2011 | Adachi ......................... 701/411 |

FOREIGN PATENT DOCUMENTS

JP    2000029383    1/2000

OTHER PUBLICATIONS

Jingsong Ma, Shoucheng Xu, Yingxia Pu, Gang Chen, "A Real-Time Parallel Implementation of Douglas-Peucker Polyline Simplification Algorithm on Shared Memory Multi-Core Processor Computers," 2010 International Conference on Computer Application and System Modeling (ICCASM 2010), printed on May 24, 2012.

* cited by examiner

*Primary Examiner* — Kanjibhai Patel
(74) *Attorney, Agent, or Firm* — Sand & Sebolt

(57) ABSTRACT

A procedure for structuring and storing data representing the form of an object that can be represented by a set of interpolation points, wherein the data representing an object is stored in a hierarchy having at least two levels, wherein a subset of the data representing the object is saved at each level and wherein the data is assigned to the levels by selecting at least two anchor points, whose data is saved in the uppermost hierarchical level, from the set of interpolation points and by consecutively selecting, from the interpolation points remaining in the set, the interpolation point with the largest distance from a line through the interpolation points and anchor points that have already been assigned to levels.

13 Claims, 3 Drawing Sheets

A)

B)

METHOD FOR SIMPLIFIED STORAGE OF DATA REPRESENTING FORMS

CROSS-REFERENCE TO RELATED APPLICATIONS

This application claims priority from European Patent Application No. 11192147.4, filed Dec. 6, 2011, the entire specification of which is incorporated herein by reference.

BACKGROUND OF THE INVENTION

1. Technical Field

The present invention concerns a method for the structuring and storing of data that reproduces the form of an object and/or a corresponding data record and/or a method of display, a corresponding map as well as a corresponding navigation device and/or a corresponding navigation software.

2. Background Information

Numerous methods for saving corresponding data or displaying such data are known from the prior art, as are navigation devices. However, when zooming into the corresponding data or maps, the problem arises that when changing the display scale, i.e., when zooming in or out, and exceeding certain change thresholds, new map material has to be loaded, which means that the user temporarily will not have any map displayed.

Generally four to sixteen stages of change thresholds are provided, which need to be used according to the display scale and loaded correspondingly.

Upon the display scale passing from one stage to another, the data of the stage now to be used is loaded and displayed accordingly. Within this stage, it is possible to change the scale to a certain degree. If, however, the change in scale is too extensive, so that another stage has to be used, the new data of that stage is loaded and displayed once again.

BRIEF SUMMARY OF THE INVENTION

The goal of the present invention is thus to provide a corresponding method and a corresponding data structure that avoids such a loading process, which leads to the display temporarily being interrupted.

First the inventor discovered that it is possible to reduce the high-resolution data while zooming out by means of the Ramer-Douglas-Peucker algorithm, so that it is possible to display the data correspondingly even when the stored number of points exceeds the number of available points that can be displayed in the current resolution. However, if n points are stored, the complexity of the Ramer-Douglas-Peucker algorithm is n×log(n). When such a method is used on mobile terminals, the computing capacity of conventional terminal devices is exceeded, so that such a simplification is not possible without a time lag.

Based on this, the inventor has found a solution that enables a corresponding display over the entire zoom range without interruption. To this end, the corresponding data is saved in hierarchical structures that are organized in such a way that, depending on the selected scale or selected resolution, the corresponding relevant points can be used for the display without requiring time-consuming computing work. If the scale is changed, the selection of the data used for the display can be changed relatively easily, without requiring time-consuming recalculation work.

Thus, the problem is solved by means of a method for storage, a data record, a method of display, a digital map, a navigation device, a navigation software, a storage medium, and a mobile terminal device, all as described herein.

Additional advantageous embodiments of the method are also provided. They can be applied accordingly to the data record. The method according to the invention for structuring and/or saving of data representing the form of at least one object that can be depicted by a set of interpolation points is characterized in that the data representing an object is structured and/or saved in a hierarchy having at least two levels. In this process, a subset of the data representing the object is assigned to each level or a subset of the data is saved in each level. The assigning to the levels is performed such that, from the set of interpolation points by which the object can be represented or is represented for this method, at least two anchor points are determined, whose data is assigned to or saved in the uppermost hierarchical level. From the remaining interpolation points or subsets of the remaining interpolation points, whose interpolation points lie between already assigned neighboring interpolation points on the object, the interpolation point having the greatest distance from a line through the interpolation points and anchor points already assigned, especially those neighboring each other, is consecutively selected, wherein the assigning to the levels is performed in descending hierarchy of the levels.

Objects that can be represented by interpolation points are generally all objects that are to be saved in the memory. Depending on the number of interpolation points, the objects can vary in complexity or be saved with varying accuracy. Generally, the corners of the object are selected as the interpolation points. Round objects, such as circles or spheres, can be approximated with any desired precision by an appropriate number of interpolation points. Thus, in order to store the corresponding data in the memory, the object first has to be represented by corresponding interpolation points. Appropriate simplification, smoothing out or the like can be performed on the object. Numerous corresponding algorithms are known from the prior art. Once the object is represented by a set of interpolation points, at least two anchor points can be chosen at first. For example, in case of a line, such anchor points are advantageously the beginning and end point of the line. For closed objects, more anchor points will be selected accordingly. The purpose of the anchor points is to enable an initial representation that shows a rough simplification of the object. For example, a circle could thus be represented by four anchor points lying on the circle. These could advantageously be distributed evenly over the circle.

Furthermore, other data can also be saved optionally, such as data on the geometrical properties of the object, for example, the property that it is an enclosed curve or a three-dimensional object or a two-dimensional object or an open object like a line.

Based on the selected anchor points, the remaining interpolation points that were not selected as anchor points are then assigned to the levels. This is done by determining the interpolation point having the greatest distance from an imaginary line through the anchor points and all interpolation points already assigned. This interpolation point is then assigned to a level and/or saved in a level. The assigning to levels and/or the saving in the levels takes place in descending hierarchy of the levels. This means that at first the assigning and/or saving is done in the highest hierarchical level and then in the levels below.

The switching from one level to the next can be determined by various criteria. For example, the number of interpolation points provided or saved in one level can be limited. Alternatively, a switching from one level to the next can also occur when the calculated distance from the line falls below a certain threshold. Also, it is possible to save only anchor points or anchor points and one or more interpolation points in the uppermost level.

Other criteria or combinations are conceivable.

After the assignment, there might be no recognizable differences remaining between anchor points and other interpolation points. Anchor points are distinguished solely in that they serve as the starting point for the first auxiliary line for further sorting of the interpolation points. However, they can also be characterized by other properties, such as the fact that they represent beginning and end points.

With such a procedure, all kinds of objects can be saved in corresponding hierarchical structures. For example, roads, paths, elevation lines, boundary lines, routes or surfaces can thus be saved accordingly. In particular, cartographical objects are saved. By a collection of such data, for example, maps can be compiled.

Advantageously, an order of interpolation points in which they are arranged on the object is stored. In this way, a representation of the object can be produced without time-consuming evaluation.

In a specific embodiment, the assignment to the levels can be performed by considering only those interpolation points lying on the object between two neighboring interpolation points that have already been assigned and by performing this step for all pairs of assigned, neighboring interpolation and anchor points between which as of yet unassigned interpolation points are located on the object. Advantageously, in this process, the assigning to levels can occur such that each interpolation point having the greatest distance from the line in the described consideration with regard to assigned, neighboring interpolation points and non-assigned interpolation points located in between on the object, is correspondingly assigned to a level. Thus, in such a step, an interpolation point is assigned to the next level for each assigned, neighboring pair of interpolation and anchor points, provided that there is an interpolation point between the two on the object. It is also conceivable in such a consideration to assign only a pre-set maximum number of interpolation points for each pair of interpolation and anchor points. However, a given maximum number of one is preferred. In another embodiment, nodes which are part of a tree structure are provided in the individual levels. Advantageously, nodes of the same stage are arranged in one level. Offspring of nodes are advantageously arranged in hierarchically lower levels. The anchor points thereby form nodes of the uppermost stage, or stand above the nodes assigned in the level below that of the anchor points or nodes of the uppermost stage of the tree structure. Advantageously, the hierarchy has the anchor points in the uppermost level and a tree structure with nodes and leaves in the levels below.

Advantageously, in step ii, the interpolation points are assigned to the nodes in the respective levels and, in particular, the assignment to the nodes is done in such a way that the order of interpolation points, in which they are arranged on the object, is stored.

Preferably, each node is assigned an interpolation point and, in the second level in particular, the number of nodes is selected to be equal to the number of anchor points minus one. This allows for numerous advantages, such as a representation of the sequence of interpolation points on the object, which proves especially practical.

It is preferable to assign two offspring to each node that has offspring and third-generation offspring, especially to each node that has offspring in lower levels.

Advantageously, the hierarchy is chosen such that the nodes represent left or right nodes and in particular the assignment to the nodes is done in such a way that interpolation points that are assigned to a level two stages further down in the hierarchy or two stages further down in the tree structure and interpolation points lying on the object between an interpolation point and its left offspring, are assigned as right offspring of the left offspring of the interpolation point, and interpolation points lying on the object between an interpolation point and its right offspring are assigned as left offspring of the right offspring of the interpolation point.

In this way, an especially effective mapping of the order of interpolation points on the object can be accomplished. The term left and/or right node here is only an especially cogent one. Instead of left and right, other terms can also be chosen. All that matters is that there are nodes of at least two, and especially two categories, which provides for a mapping of the order of interpolation points on the object, especially in interplay with the arrangement in the levels and/or the stages of the tree structure.

Advantageously, at least with respect to one level and/or one node, data on the minimum and/or maximum distance of the interpolation points of a level from the line through all interpolation points of the hierarchically superior levels and anchor points is stored.

It is especially advantageous to store, for each node that is not part of the hierarchically uppermost level, the distance(s) of the interpolation point(s) stored in the node(s) from a line through the neighboring, hierarchically superior interpolation points.

In this way, the data to be displayed or processed afterwards can be sorted and/or selected more quickly using the appropriate distance criteria.

In this way, for example, information can be saved in or to a level as to from which or up to which resolution the interpolation points contained therein are to be used for representation.

It is also conceivable that data of different objects is stored together and thus that data of different objects are stored in each level of a data record. Preferably, however, the saving is done in such a way that the data of different objects are first separated and then saved separately in a hierarchically manner.

It is especially advantageous to use the method with respect to objects that are linear and have a beginning and end point. In this case, beginning and end points are advantageously used as anchor points. For example, this concerns roads, paths, border lines, routes, railways, contours, or the like. These can often be treated, i.e., structured, saved and/or displayed, in a simplified manner as a line.

Furthermore, information regarding the type of the object or its display properties and/or extension are advantageously saved with the data of at least one object is. Thus, for example, the fact that the object is a road or a lake can be included. Additionally, information regarding, for example, the choice of display properties with which the object is to be displayed, or the resolution/scale at which the object is to be displayed can be recorded. In this way, for example, objects can be assigned to levels and jointly processed or activated and deactivated. Additional information that is saved with the data of the object is conceivable.

With such a method, a data record can simply and reliably be generated that is suitable for a display which can represent a desired display even with substantial scale changes with no lag time or with short lag times, in particular avoiding temporary intervals in which no data is displayed. If the computing capacity and/or memory access speed during the use of such a data record is not sufficient for real-time representation of the required information, it is not necessary to first load the more detailed information in lower levels and this information can be loaded gradually. In this way, an outage of the entire display is avoided, despite the short computing time.

The invention is also solved by a data record representing the form of at least one object that can be represented by a set of interpolation points. The data record has levels hierarchically related to each other, in which the data representing an object is stored. A subset of the data representing an object is stored in each level. The assignment of the data to the levels is such that, in the hierarchically upper level, data is stored for at least two anchor points, selected from the interpolation points by which the at least one object can be represented and/or is represented for the storage. The data of the remaining interpolation points is distributed among the levels such that the distance of each interpolation point of each level in question of a line through the interpolation points of the levels situated hierarchically above the level in question and anchor points is smaller than the distance of each interpolation point, apart from the anchor points, of the levels situated hierarchically above the level in question from a line through all other interpolation points stored in all levels situated hierarchically above the level in question and the anchor points. Advantageously, the treatment is limited each time to a subset of the interpolation points lying on the object between neighboring interpolation points of a higher level. Thus, interpolation points of a lower level will always have a smaller distance from a line through the neighboring interpolation points of the higher levels than in the case of an interpolation point between neighboring interpolation points of a higher level with regard to a line through neighboring interpolation points of the still higher levels.

This can be especially well described by a tree structure having branches with nodes, each of the nodes having among themselves a parent-offspring relation, wherein parents and offspring are each arranged in different stages of the tree structure, and an offspring of a node of stage n is arranged in the stage n+1, such that in each branch interpolation points of stage n have a smaller distance from a line through the interpolation points of stages <n than the interpolation points of stage n−1 of the same branch from a line through the interpolation points of the branch of the stages <(n−1).

This means that the distances of the points in hierarchically lower levels with respect to the line through all already-stored interpolation points and anchor points, possibly when limiting the consideration of neighboring interpolation points, especially within a branch, become smaller each time. As a result, the degree of detail of the representation increases when using interpolation points of lower levels or lower situated nodes.

If the degree of detail needs to be reduced, it is sufficient to no longer use the interpolation points of lower levels/nodes and to base the representation solely on interpolation points/ nodes of higher levels.
With such a data record, corresponding objects can be saved in memory and provided in such a way that an interruption-free representation is possible over the entire range of scale selection.

As regards the sequence, advantageously the interpolation point(s) of the node(s) of the uppermost stage, stage zero, lie(s) between the neighboring anchor points. This could also be mapped by an appropriate tree structure that makes the node(s) of the uppermost stage a right offspring of a first anchor point and a left [offspring] of a second anchor point.

Furthermore, based on an interpolation point of a node, the interpolation point of the right offspring of the node zero preferably lies on the opposite side of the interpolation point of the node compared with the interpolation point of the left offspring of the node.

Additionally, an interpolation point of a node on the object preferably lies between the interpolation point of its parent node and its grandparent node.

It is especially advantageous to use such a data record when providing line-shaped objects that have a beginning and an end point, wherein the beginning and end points are advantageously used as anchor points. Furthermore, additional data, such as data regarding the minimum and/or maximum distance of the interpolation points of a level from the line through all interpolation points of all hierarchically superior levels and anchor points, or other properties regarding the object, the display properties and/or [its] extension, can be saved in the data record.

The described features of the method can also advantageously be implemented in the data record accordingly. This holds especially for the described tree structures and their advantageous embodiments, in which in particular the order of the interpolation points on the object is reproduced.

The problem is also solved by a method for the scale-altering loading-optimized display of a data record representing the form of at least one object, as described above or generated by a method as likewise described above, for representing the at least one object. Depending on the selected display scale, only interpolation points of a selection of levels and/or nodes beginning with the hierarchically uppermost level/stage and down to a display limit level that is hierarchically inferior by one or more stages or inferior to a display limit node that is hierarchically inferior by one or more stages, are represented along with the anchor points. The display limit level/node is selected to be a level or one or more node(s) of one or more stages, depending on the display scale. Thanks to such a selection of the interpolation points used for the representation, one can realize an interruption-free representation with variable scale, even with rather small computing capacity. In the case of multiple interpolation points that are not distinguished from one another, the problem of their sequence on the object must be solved. This can be achieved in part with knowledge of the assignment rules that apply during the data creation. Preferably, however, the data contains a corresponding distinguishing feature, in particular by assignment to nodes, levels, and/or sequence number, or the like.

It is especially advantageous to select as the display limit level a hierarchically superior level if the scale/resolution is reduced beyond a certain degree and an inferior level if the scale/resolution is increased beyond a certain degree.

The interpolation points or levels/nodes to be considered can be selected by calculating the corresponding distances and making a decision based on this for each case. Advantageously, however, the selection is based on corresponding additional stored data, such as information about the minimum and/or maximum distances of the interpolation points of a level from a line through all interpolation points and anchor points of the hierarchically superior levels/nodes, especially limited to neighboring interpolation points of each branch.

It is also conceivable that such a decision is made based on stored information regarding the dependency of the use of levels/nodes on a scale/resolution. Thus, for example, at least one limit scale with some of the levels/nodes or each of them can be saved and the selection can be based on this information.

It is especially advantageous to select the display limit level such that the lowest level is selected as the display limit level for which it holds that all interpolation points of the selected level have a distance from a line through all interpolation points of all hierarchically superior levels that is greater than or equal to the resolution of the display. In this way, only those interpolation points are selected that are stored in levels at which all interpolation points lead to a relevant change of the display. Those levels containing interpolation points that would not cause any relevant change of the display if additionally considered for the selected resolution are thus ignored, which reduces the complexity of the display.

Additionally it is very advantageous to use all interpolation points for which it is true that their distance from the line through all other interpolation points used and/or arranged in superior or hierarchically equal levels is greater than 1 point of the display per scale of the display. Thus, the interpolation points will be used if the distance from the line is greater than or equal to the pixel interval multiplied by the current scale magnification. For example, if the pixel interval varies in different directions, such a directional dependency can be factored in. If, for example, the interval between pixels in the direction or at the location of the vertical line through the interpolation point in question on the line is 0.25 mm and if the selected scale is 1 mm per 100 mm (display distance per actual distance), then the interpolation point will taken into consideration if its distance is greater than 25 m.

The selection can also be node-based, especially with the mentioned criteria, so that nodes of different stages can be used as display limit nodes in different branches under certain circumstances. In particular, all interpolation points or all interpolation points of nodes are used for which it holds true that their distance from the line through all other interpolation points, especially neighboring ones belonging to the same branch, is greater than 1 point of the display per the display scale. Thus, the interpolation points/nodes are used if the distance from the line through neighboring interpolation points of a superior level is greater than or equal to the distance of the pixels multiplied by the current scale magnification.

With particular advantage, the display limit level can be selected such that the inferior level is selected as the display limit level for which it holds true that all interpolation points of the selected level would not lie on the represented object at the given resolution if a hierarchically higher level were selected as the limit level. In that case, no levels are considered for the display that contain interpolation points that, for the chosen representation, would not lead to any change in the display.

Alternatively, each interpolation point from the level hierarchically superior to the display limit level that would not lie on the represented object for the given resolution if this interpolation point were not used for the representation can additionally be used for the representation. With such a procedure, along with the interpolation points chosen by the selection of a level, an interpolation point that is stored in a lower level, yet would still lead to a change in the representation for the chosen resolution, could also be considered. For example, if the display limit level is selected based on appropriate additionally stored information, the selection in the inferior level or the inferior levels could be based on interpolation points, for example, by calculating the distance or by evaluating the stored distance, thereby further improving the representation.

By making use of nodes, the interpolation points to be displayed can advantageously be selected based on the nodes, such that display limit nodes are also selected from different branches of the tree structure, even from different hierarchical levels. Such a selection is advantageously done on the basis of the distance, in particular the stored distance, of the interpolation point from the line between neighboring interpolation points of superior levels on the object, such that, in every branch, interpolation points in nodes in hierarchically inferior levels or higher stages of the tree arrangement will be used for the display until an interpolation point or node no longer fulfills a given requirement, such as one of requirements described above.

The problem is also solved by a digital map having at least one data record as described above or a data record stored according to a method as described above and especially a device for carrying out a method for displaying data as described above. Such a digital map can thus have a display function, and especially a scale change function.

The problem is also solved by a navigation device having a digital map and/or adapted to carry out a display method as described above.

The problem is also solved by navigation software having a digital map as described above and/or adapted to carry out a data display method as described above.

The problem is also solved by a data medium having corresponding navigation software or a corresponding digital map.

The problem is further solved by a mobile terminal device, in particular a mobile telephone, tablet PC, or smart phone having a digital map as described above and/or adapted to carry out a data display method as described above.

BRIEF DESCRIPTION OF THE DRAWINGS

Additional embodiments and advantages will be described, purely exemplary, using the following schematic drawings in which.

DETAILED DESCRIPTION OF THE PRESENT INVENTION

Figure 1:
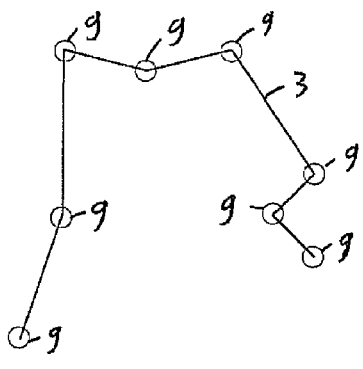
FIG. 1 shows a schematic overview of the method for creating a data record according to the invention.
Figure 1:
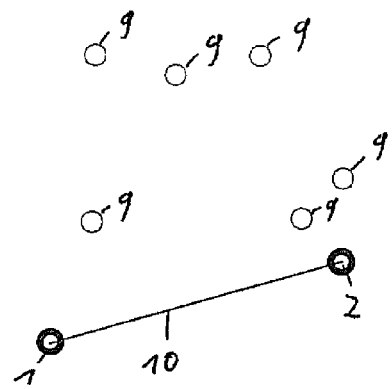
Figure 1:
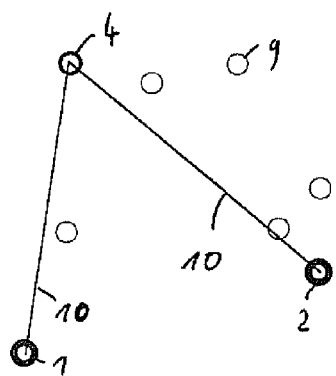
Figure 1:
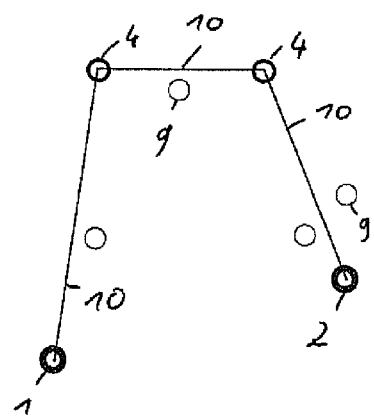
Figure 1:
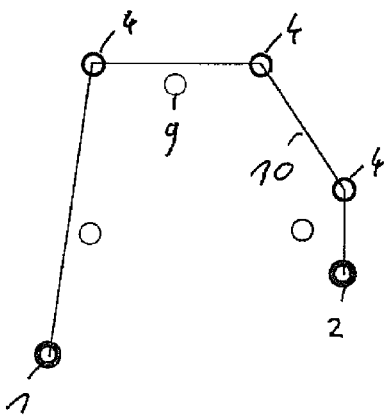
Figure 1:
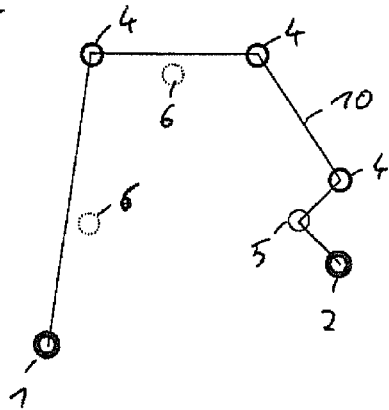

FIG. 1 illustrates the creation of a data record according to the invention and the method of the creation according to the invention. FIG. 1a shows an object 3, which is a line. Also shown are the interpolation points 9 that can be used to create a representation. The interpolation points 9 are not as yet assigned to a level. First, after determining the interpolation points 9 as shown in FIG. 1a, the anchor points 1, 2 are determined as illustrated in FIG. 1b, and they are then stored in the hierarchically uppermost level.

Next, the anchor points 1, 2 are connected by an imaginary auxiliary line 10 and then the interpolation point 9 is determined that located at the greatest distance from the auxiliary line 10. This interpolation point 9 is then assigned to a level. In this case, it is not assigned to the first level, to which the anchor points 1, 2 were assigned, but rather to the second level, and it thus represents an interpolation point 4 of the second level. This can be seen in FIG. 1c. New auxiliary lines 10 are then drawn through all assigned interpolation points 4 and anchor points 1, 2 and again the interpolation point 9 that has the greatest distance from the lines is determined. This interpolation point 9 is then assigned to a level. In this case, this interpolation point 9 is also assigned to the second level, and it thus also represents an interpolation point 4 of the second level. This is illustrated FIG. 1d. Also shown in FIG. 1d are the new auxiliary lines 10. An interpolation point 9 that has the greatest distance from the help lines 10 is again determined based on these new auxiliary lines 10. This interpolation point 9 is then assigned to a level. In this case, this point is again also assigned to the second level, so that it likewise represents an interpolation point 4 of the second level. This can be seen in FIG. 1*e*. Also shown in FIG. 1*e* are the new auxiliary lines 10, which run through the anchor points 1, 2 and all interpolation points 4 that have already been assigned. Based on these, the interpolation point 9 with the greatest distance is again determined.

Here, this interpolation point is assigned to the third level and thus represents an interpolation point 5 of the third level, as can be seen in FIG. 1*f*. Also shown are the new auxiliary lines 10 through the anchor points 1, 2 as well as all assigned interpolation points 4, 5. The additional interpolation points 9 are assigned to the fourth level and thus represent interpolation points 6 of the fourth level, as is also shown in FIG. 1*f*.

Figure 2:
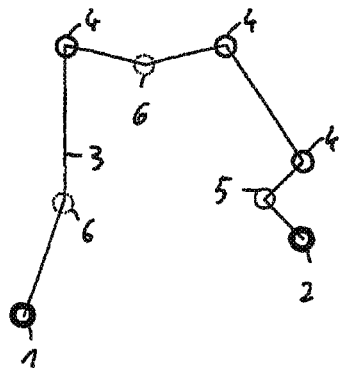
FIG. 2 shows various representations of a corresponding data record.
Figure 2:
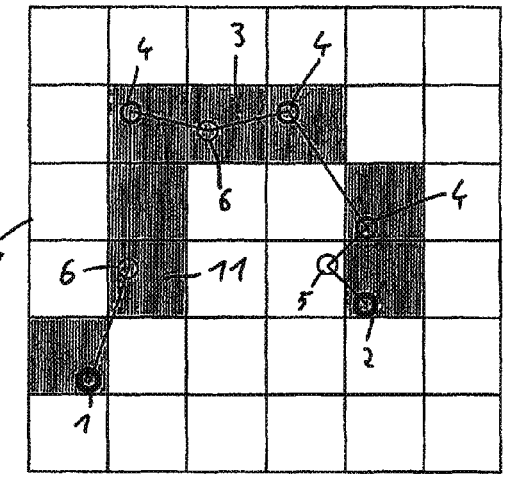
Figure 2:
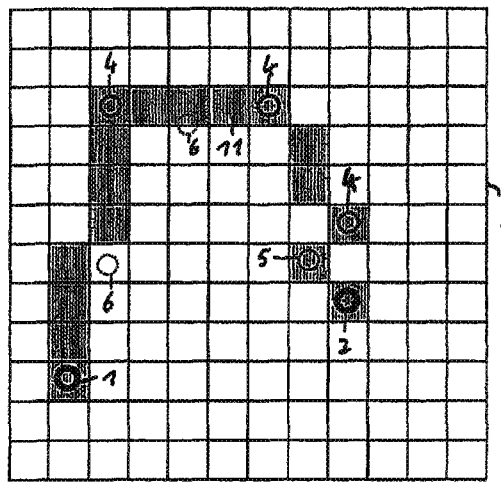
Figure 2:
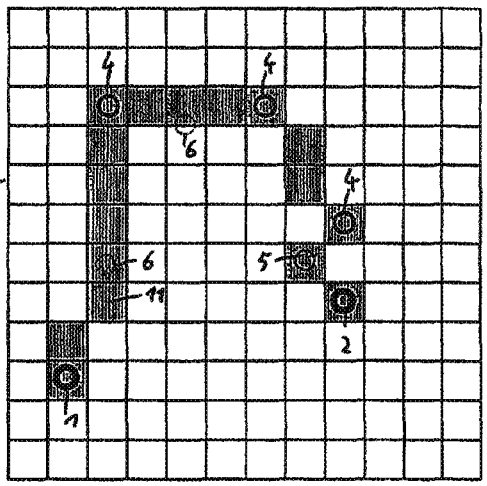
Figure 2:
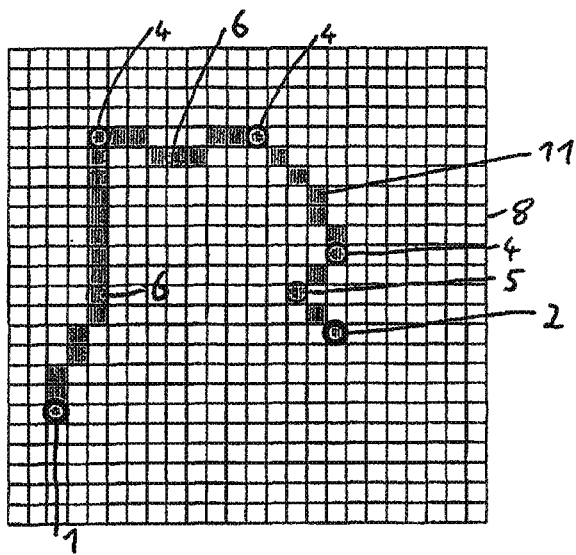

FIG. 2*a* again shows the object 3 together with the first anchor point 1, the second anchor point 2, the interpolation point 4 of the second level, the interpolation point 5 of the third level, and the interpolation point 6 of the fourth level.

FIG. 2*b* illustrates the representation 11 of the object 3 in a grid 8. The grid 8 represents a display that works with pixels and can produce a corresponding representation 11 by changing the color of the pixels. In this case, only the interpolation points 4 of the second level and the anchor points 1 and 2 were used to create the representation 11 and a connection between these points was emphasized by corresponding color change as representation 11.

FIG. 2*c* shows a representation 11 with a down-scaled grid 8, i.e., with higher resolution. Here, to create the representation 11, the anchor points 1, 2 as well as the interpolation points 4 in the second level and the interpolation point 5 of the third level were taken into account. The representation 11 was created by color changes of connecting lines between these anchor and interpolation points 1, 2, 4, 5.

FIG. 2*d* shows an alternative representation 11 in the same grid 8. However, those interpolation points 6 from the fourth level have been considered that would lead to a change of the representation. Thus, for example, from the fourth level, the interpolation point 6 located in the left center was considered in creating the representation 11.

FIG. 2*e* shows a further representation 11 of the object 3 in a grid 8 that has been down-scaled even further. Here, all interpolation points 6 of the fourth level were also used for the representation.

The sequence of FIGS. 2*b*, *c/d*, and *e* illustrates how zooming, i.e., the changing of the scale, affects the representation 11 when various interpolation points 4, 5 and 6 are or are not considered.

Additional advantageous embodiments can be discovered by a person ordinarily skilled in the art and can be adapted to the particular purpose of application.

Figure 3:
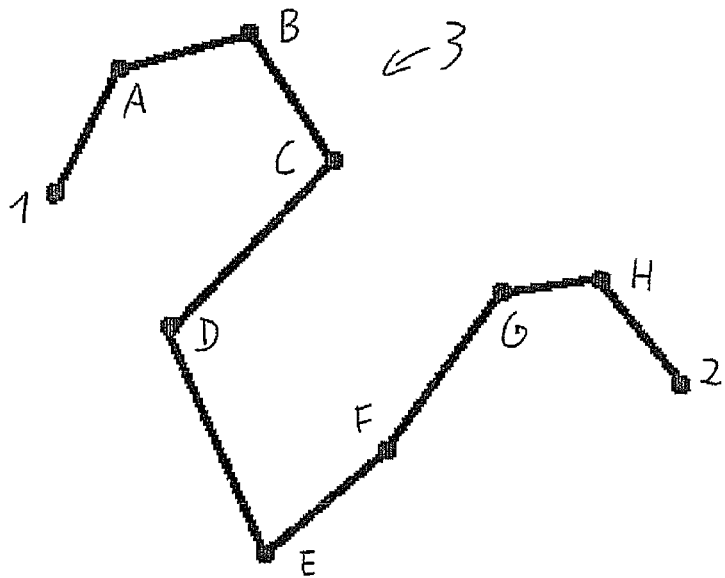
FIG. 3 shows a tree structure as well as a schematic overview of the method for creating a tree structure.
Figure 3:
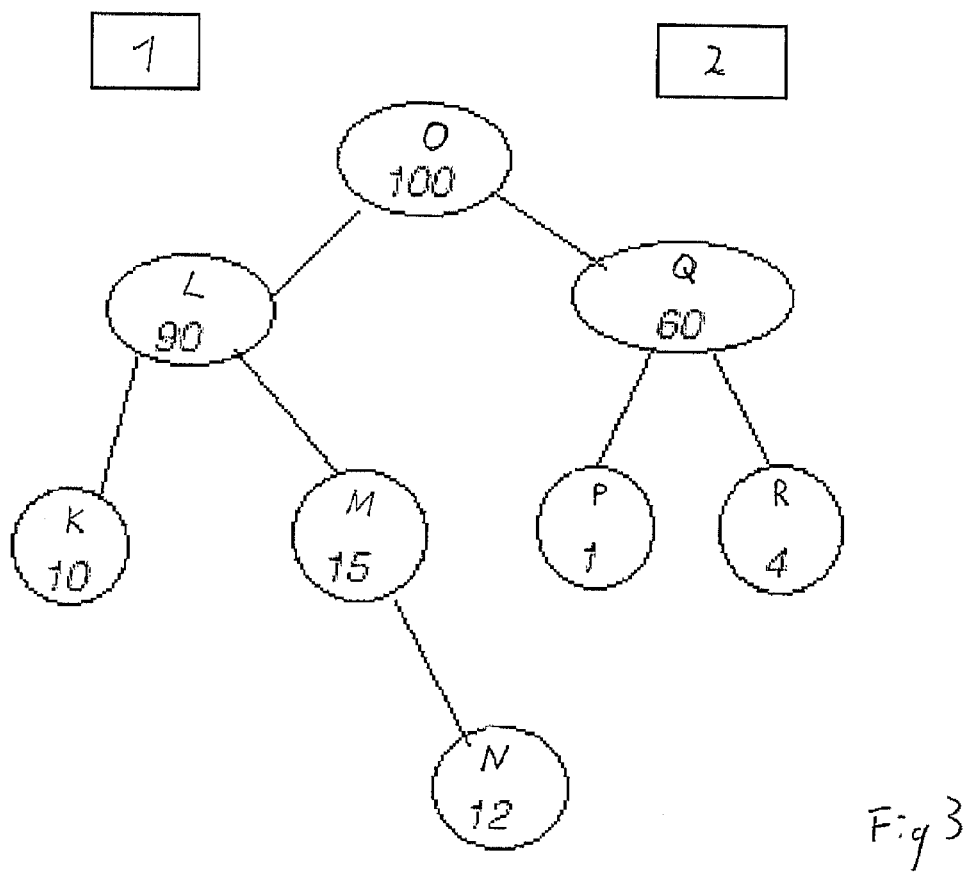

FIG. 3A shows an object 3 with a first anchor point 1, a second anchor point 2, and further interpolation points A-H. To create a data record according to the invention, first the anchor points 1, 2 are determined. Next, from the subset of interpolation points that lie between the anchor points 1, 2, in this case interpolation points A-H, the point having the greatest distance from the auxiliary line between the anchor points 1, 2 is determined. This is interpolation point E. It has a distance of 100.

Interpolation point E is assigned to a level, more precisely a node E-H, in this case the uppermost node O. Node O is a node of stage zero. Now as an assigned interpolation point, interpolation point E now divides the remaining interpolation points A-D and F-H into two subsets A-D and F-H. Together with the anchor points 1, 2, interpolation point E thus forms a pair of interpolation/anchor points 1E, E2.

Based on one auxiliary line between each of the pairs of interpolation/anchor points, of the subsets of interpolation points, the interpolation point having the largest distance from the corresponding auxiliary line, which runs through the neighboring anchor/interpolation points of the assigned pair of interpolation/anchor points, is determined.

With respect to the subset of interpolation points A-D, its corresponding pair of interpolation/anchor points is pair 1E. Of this subset, the interpolation point with the greatest distance from the line through anchor point 1 and interpolation point E is the interpolation point B. It is assigned to the node L (see FIG. 3B). Node L is a left offspring of node O and belong to stage one.

With respect to the subset of interpolation points F-H, its corresponding pair of interpolation/anchor points is the pair E2. Of this subset, the interpolation point with the greatest distance from the line through interpolation point E and anchor point 2 is the interpolation point G. It is assigned to the node Q. Node Q is a right offspring of node O and belongs to stage one.

The assigned interpolation points B and G again divide the subsets into four subsets A, C-D, F, and H, which are now to be considered. The relevant pairs of interpolation/anchor points are the pair of interpolation/anchor points 1B for subset A, the pair of interpolation/anchor points BE for subset C-D, the pair of interpolation/anchor points EG for subset F, and the pair of interpolation/anchor points G2 for subset H. Now, the interpolation point with the greatest distance from the line through the corresponding pair of interpolation/anchor points is again determined based on the subsets. This is trivial in the case of the subsets A, F, G, which contain only one interpolation point. These interpolation points are assigned to nodes K, P, and R. They are nodes of the second stage. Node P is a left offspring of node Q and thus a left node. Node R is a right offspring of node Q and thus a right node. Node K is a left offspring of node L.

With regard to subset C-D the determination is not trivial. The interpolation point at the greatest distance is interpolation point D. It is assigned to node N. Node N is a node of stage three and a right offspring of node M.

The remaining interpolation point lies between the pair of interpolation/anchor points BD. It is assigned to a node (not shown) of stage four as a right offspring of node N.

FIG. 3B shows the structure made from anchor points 1, 2 as well as the tree structure with nodes K-R. The number of nodes of stage zero, here node O, is one less than the number of selected anchor points 1, 2. The distance between the interpolation point assigned to each node and the auxiliary line through the neighboring pair of interpolation/anchor points can also be seen from the tree structure. It is indicated in the representation below the reference number of each node.

Independently of the alphabetic designation of the nodes, the sequence of the interpolation points on the object can also be inferred from the structure. This is possible in two ways.

First, the interpolation point of the node of stage zero, node O, interpolation point E, lies between anchor points 1, 2. This could also be highlighted by a corresponding tree structure showing node O as a right offspring of anchor point 1 and a left offspring of anchor point 2.

Furthermore, starting from interpolation point E of node O of stage zero, the interpolation point G of the right offspring of node O of stage zero lies on the opposite side of interpolation point E compared to interpolation point B of the right offspring. This continues to be the case for nodes of the following stages one through n.

Also, an interpolation point A, C, F, H of a node K, M, P, R lies on the object between the interpolation point B, G of its parent node L, Q and its grandparent node O, respectively.

LIST OF REFERENCE SYMBOLS 1 first anchor point
2 second anchor point
3 object
4 interpolation point of the second level
5 interpolation point of the third level
6 interpolation point of the fourth level
7 additional interpolation point
8 grid
9 interpolation point (not assigned)
10 auxiliary line
11 representation of the object
A-H interpolation point
K-R nodes

The invention claimed is:

1. A method for structuring and/or storing of data within a navigation device or a mobile terminal device, where the data represents the form of at least one object which can be represented by a set of interpolation points,
   a. wherein the data representing the interpolation points by which the object can be represented and/or is represented for the structuring and/or storage, is structured and/or stored in a memory of the navigation device or the mobile terminal device in a hierarchy having at least two levels,
   b. wherein each level is assigned a subset of the data and/or a subset of the data is stored in each level,
   c. wherein the data is assigned to the levels by
      i. determining, from the set of interpolation points, at least two anchor points, the data of which is assigned to the hierarchically uppermost level and/or stored in the hierarchically uppermost level,
      ii. consecutively selecting, from the interpolation points remaining in the set, or from the subset
         of interpolation points lying between neighboring assigned interpolation points on the object,
         the interpolation point, respectively,
         that has the largest distance from a line through the interpolation points and anchor points already assigned to levels, in particular those neighboring the interpolation point, and
         assigning the data of this selected interpolation point to a level and/or storing it in a level,
      iii. wherein the assignment to levels and/or storage at levels occurs in descending hierarchy of the levels.

2. The method according to claim 1, wherein the assignment in step ii. is performed in such a way that a level is assigned all interpolation points which, among the interpolation points lying on the object between every two already assigned and while leaving out the interpolation points that have not yet been assigned neighboring interpolation points, have the greatest distance from a line through these already assigned neighboring interpolation points.

3. The method according to claim 1, wherein a sequence of interpolation points in which they are arranged on the object is stored in a memory of the navigation device or the mobile terminal device.

4. The method according to claim 1, wherein the hierarchy has the anchor points in the uppermost level and the subordinate levels form a tree structure with nodes and leaves, wherein, in step ii., the interpolation points are assigned to the nodes in the respective levels and the assignment to the nodes is performed in such a way that a sequence of interpolation points, in which they are arranged on the object, is stored.

5. The method according to claim 4, wherein the nodes represent left or right nodes and the assignment to the nodes is performed in such a way that interpolation points that are assigned to a level two stages lower in the hierarchy, and that lie on the object between an interpolation point and its left offspring are assigned as right offspring of the offspring of the interpolation point, and the interpolation points lying on the object between an interpolation point and its right offspring are assigned as left offspring of the offspring of the interpolation point.

6. The method according to claim 1, wherein the object is line-shaped and has a beginning and end point, and the beginning point and end point are used as anchor points.

7. The method as defined in claim 1, wherein the structuring and/or storing of data represents the form of at least one 2-dimensional object.

8. A data record within one of a navigation device or a mobile terminal device, representing the form of at least one object that can be represented by a set of interpolation points,
   a. wherein the data record has levels that stand in a hierarchical relation to each other, in which the data representing the interpolation points by which the object can be represented and/or is represented for structuring and/or storage is stored in a memory of the navigation device or the mobile terminal device,
   b. wherein a subset of the data is stored in each level,
   c. wherein the data is assigned to the levels by
      i. data of at least two anchor points selected from the interpolation points of the at least one object being stored in the hierarchically uppermost level,
      ii. the data of the remaining interpolation points being distributed among the levels such that
         the distance of each considered interpolation point of each considered level has a smaller distance
         from a line through the interpolation points of the levels hierarchically superior to the considered level,
            in particular the interpolation points neighboring the considered interpolation point,
         than each interpolation point,
            in particular each interpolation point between the neighboring interpolation points of levels that are superior to the considered level,
         apart from the anchor points,
         of levels arranged hierarchically above the considered level
         with regard to a line through all other,
            especially all neighboring,
         interpolation points and anchor points stored in all levels that lie hierarchically above the particular level.

9. A method for the scale-altering and loading-optimized display of a data record representing the form of at least one object according to claim 8 for the representation of the at least one object,
   wherein, depending on the selected display scale, besides the anchor points, only interpolation points of a selection of levels and/or nodes are displayed, starting from the hierarchically uppermost level down to a display limit level that is hierarchically inferior by one or more stages and/or down to one or more display limit nodes in various branches hierarchically inferior by one or more stages, wherein the level selected as the display limit level and/or the display limit nodes are selected dependent on the display scale.

10. The method according to claim 9, wherein a hierarchically superior level is selected as the display limit level and/or one or more hierarchically superior display limit nodes are selected as the display limit nodes when the scale is reduced beyond a certain threshold, and a hierarchically inferior level is selected as the display limit level and/or one or more hierarchically superior display limit nodes are chosen as the display limit nodes when the scale is increased beyond a certain threshold.

11. The method according to claim 9, wherein the display limit level and/or the display limit nodes is/are selected in such a way that the lowest level is selected as the display limit level and/or the lowest nodes are selected as the display limit nodes for which it holds true that all interpolation points of the selected level and/or the selected nodes have a distance from a line through all interpolation points of all hierarchically superior levels and anchor points, in particular through the neighboring interpolation points on the object that belong to hierarchically superior nodes and/or levels, that is equal to or in particular greater than the resolution of the display.

12. The data record as defined in claim 8, wherein the data record represents the form of at least one 2-dimensional object.

13. The data record as defined in claim 8, wherein the data record is part of a digital map.

* * * * *